Oct. 29, 1968     E. SAARINEN ET AL     3,407,791
SUPPLY VALVE ASSEMBLY FOR VARIABLE COMPRESSION
RATIO PISTON ASSEMBLY

Filed Dec. 8, 1967     2 Sheets-Sheet 1

INVENTORS
EDWARD SAARINEN
THOMAS J. PEARSALL

BY *Hauke, Krass, & Gifford*
ATTORNEYS

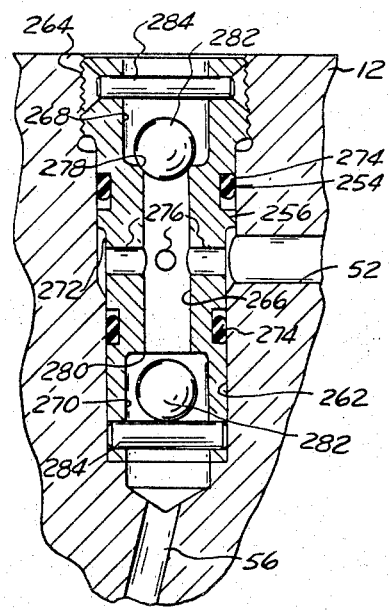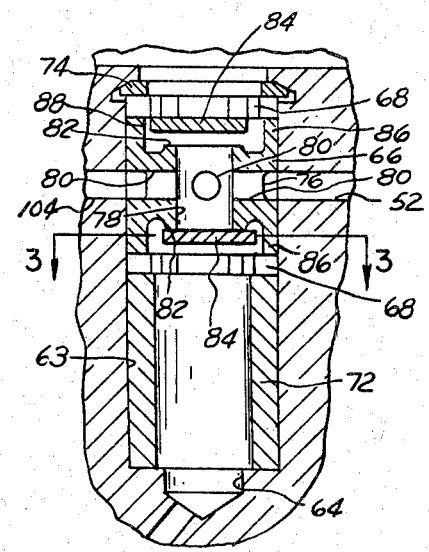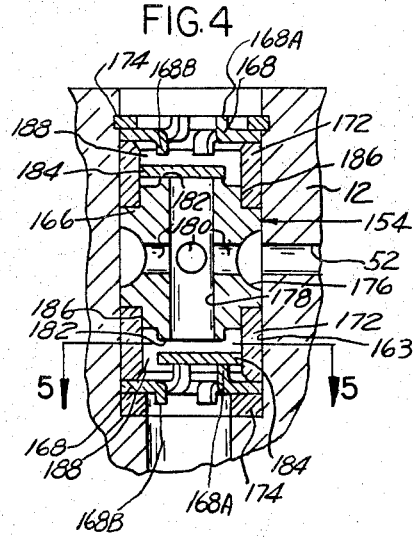

United States Patent Office 3,407,791
Patented Oct. 29, 1968

3,407,791
SUPPLY VALVE ASSEMBLY FOR VARIABLE COMPRESSION RATIO PISTON ASSEMBLY
Edward Saarinen, Detroit, and Thomas J. Pearsall, Grosse Pointe Farms, Mich., assignors to Continental Aviation and Engineering Corporation, Detroit, Mich., a corporation of Virginia
Filed Dec. 8, 1967, Ser. No. 689,202
10 Claims. (Cl. 123—78)

ABSTRACT OF THE DISCLOSURE

A two-part variable compression ratio piston assembly having an outer member movable relative to an inner member to vary the compression ratio of an internal combustion engine and a hydraulic system for automatically controlling relative movement of the members to maintain a predetermined maximum combustion chamber pressure. The hydraulic circuit includes an upper and a lower chamber which expand and contract conversely upon relative movement of the piston member and a system for supplying and discharging an incompressible fluid from these chambers in a manner which gradually increases the compression ratio of the engine until a predetermined maximum combustion chamber pressure has been achieved and which tends to maintain the maximum combustion chamber pressure after it has been achieved. The fluid preferably comprises oil from the lubrication system of the engine supplied to the piston through the connecting rod and the hydraulic system includes a new supply valve assembly which supplies oil to both the chambers.

*Background of the invention*

The present invention relates to variable compression ratio (VCR) piston assemblies such as those disclosed in prior U.S. Patents Nos. 3,156,162; 3,161,112; 3,185,137; 3,185,138; 3,303,831; 3,311,096. In the disclosures of these patents an inner piston member or carrier is connected in the usual manner to a connecting rod and an outer piston member or shell is carried by and is movable axially relative to the inner member. Relative movement of these members varies the compression ratio of the particular cylinder in which the piston moves. Clearance spaces are provided between the top and bottom ends of the inner and outer members and these form upper and lower chambers which vary conversely in volume in relation to the relative movement of the members. An incompressible fluid such as lubrication oil is supplied to these chambers in a manner which automatically regulates movement of the members to gradually increase the compression ratio when a predetermined combustion chamber pressure has been achieved. The hydraulic system then varies the movement of the members in a manner which tends to maintain a uniform maximum combustion chamber pressure.

In the constructions disclosed in these patents the system for supplying fluid to the upper and lower chambers has included a one-way inlet check valve for each chamber. Some of these patents disclose various constructions for these valves and these, as well as the pressure regulating discharge valve assembly also necessary in the combinations therein disclosed, have been enclosed in casings. Supply valves have been previously disclosed which utilize valve plates or balls which open and close in response to inertial effects and fluid pressure changes without the aid of springs or the like. None of these, however, have combined the two supply valves into a single assembly which can be installed and removed with greater ease than heretofore possible.

*Summary of the invention*

The present invention provides a new variable compression ratio piston assembly which includes a new unitary valve assembly for supplying oil to both the upper and lower chambers. The valve assembly comprises valve plates in several embodiments, or balls in another embodiment, housed in a valve casing and operable to regulate the supply of oil to both the upper and the lower chambers.

*Description of the drawings*

Several preferred embodiments of the present invention are described more fully in the following description which refers to the accompanying drawings and in which like reference characters refer to like parts throughout the several views and in which:

FIG. 2 is an enlarged fragmentary cross-sectional view illustrating more clearly the supply valve assembly shown in FIG. 1.

FIG. is a cross-sectional view taken substantially on line 3—3 of FIG. 2 and enlarged somewhat for purposes of clarity, FIG. 4 is a view similar to FIG. 2 but illustrating another preferred embodiment of the present invention, FIG. 6 is a view similar to FIG. 2 but illustrating still another preferred embodiment of the present invention.

*Description of several preferred embodiments*

Figure 1:
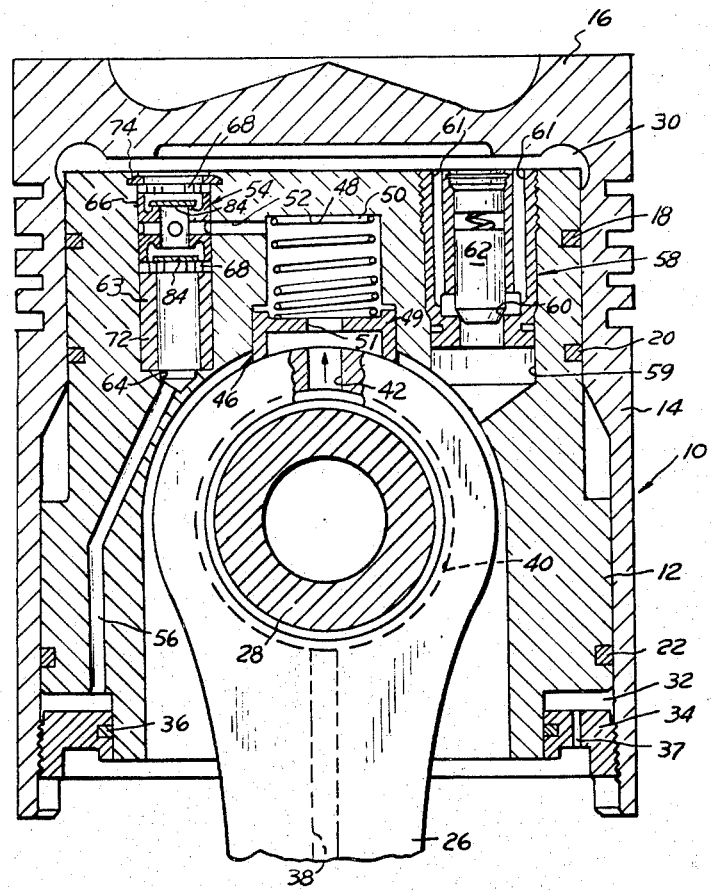
FIG. 1 is a longitudinal cross-sectional view of a piston assembly including one preferred construction of a supply valve assembly of the present invention.

Now referring to the drawings for a more detailed description of the present invention, a preferred variable compression ratio (VCR) piston 10 is illustrated in FIG. 1 as comprising an inner member or piston pin carrier 12 carrying on its outer surface an outer member or shell 14. The outer member 14 has a crown 16 which serves as the head of the piston 10 and which forms a movable wall of the lower boundary of the combustion chamber of the engine. Inner member 12 is axially slidable within and with respect to the outer member 14 and is provided with rings 18, 20 and 22 which engage the inner surface of the outer member 14 and provide a fluid tight seal between these surfaces. Inner member 12 is linked to the crankshaft (not shown) of the engine by a connecting rod 26 and a wrist pin 28 in the conventional manner.

Thus, the inner member 12 is movable axially between fixed upper and lower limits in the manner of a conventional piston while the outer member 14 can move axially upwardly and downwardly relative to the inner member 12 within limits which will be presently described. An upper variable volume chamber 30 is formed intermediate the upper surface of the inner member 12 and the lower surface of the crown 16. A lower variable volume chamber 32 is formed intermediate the lower surface formed by an annular recess at the lower end of the inner member 12 and by the upper surface of a ring 34 fixed to the outer member 14. A sealing ring 36 prevents fluid leakage from the lower chamber 32 intermediate the adjacent surfaces of the inner member 12 of the ring 34. A restricted orifice 37 of a fixed diameter is formed in the ring 34 and provides communication between the chamber 32 and the crankcase of the engine.

The ring 34 and the lower surface of the crown 16 defining the upper chamber 30 provide the limits of axial movement of the outer member 14 relative to the inner member 12. This relative movement provides a variable height from the center of the wrist pin 28 to the top of the piston crown 16 to thereby vary the compression ratio of the engine by varying the clearance volume of the combustion chamber. This movement of the outer member 14 relative to the inner member 12 is automatically controlled by regulating the flow of an incompressible fluid into and out of the chambers 30 and 32. The control fluid preferably comprises oil supplied to the piston 10 from the usual pressurized lubricating oil supply of the engine by an oil passage 38 in the connecting rod 26. The passage 38 preferably connects with an annular groove 40 encircling the piston pin 28 and leading to an outlet 42. A slipper collector assembly generally indicated at 46 is disposed in a cavity 48 formed in the inner member 12 and comprises a cap member 49 urged by a spring 50 into sliding, sealing contact with the connecting rod 26. The cap member 49 is provided with a vertical opening 51 and collects the oil discharging from the outlet 42 to direct it through the opening 51 to the cavity 48.

Figure 3:
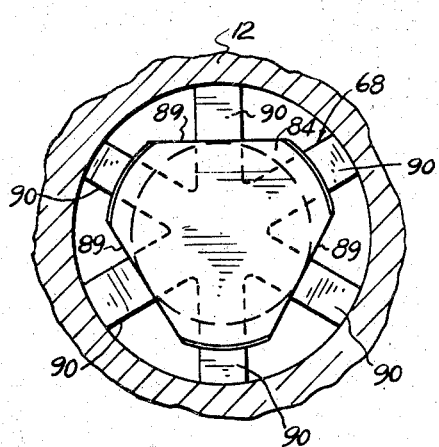

Oil is fed from the cavity 48 to the upper and lower chambers 30 and 32 in the embodiments of FIGS. 1, 2 and 3 by way of a passage 52 connected with the chamber 48 and connecting to the upper chamber 30 and the lower chamber 32 through a supply valve assembly generally indicated at 54. A passage 56 formed in the inner member 12 communicates the lower end of the valve assembly 54 with the lower chamber 32.

Oil is discharged from the upper chamber 30 to crankcase atmosphere by way of a pressure regulating discharge valve assembly 58 disposed within a drainage passage 59 and operable to move upwardly away from seat 60 to open oil flow from passages 61 past the open valve 62 to crankcase atmosphere when oil pressure in the upper chamber 30 exceeds a predetermined value.

The supply valve assembly 54 as can best be seen in FIG. 2 preferably comprises a port member 66 arranged substantially parallel to the axis of reciprocation of the piston 10 with stops 68 disposed at each end, and mounted in position in a bore 63 by a spacer cylinder 72 and a retaining ring 74. The cylinder 72 rests against a shoulder formed at the juncture of bore 63 and counterbore 64. The bore 63 communicates with the upper chamber 30 and the counterbore 64 registers with the passage 56. Port member 66 is provided with an external annular groove 76 which registers with the passage 52 and communicates with an interior through passage 78 by way of a plurality of annularly spaced ports 80. Valve seats 82 are formed at each end of the through passage 78 and are adapted to be engaged by valve plates 84. The ends of the port member 66 are formed with extended cylindrical portions 86 which engage the stops 68 so that a chamber 88 is formed in each end of the port member 66 intermediate the seats 82 and the stops 68 to provide an area permitting the valve plates 84 to move freely between a position closing the through passage 78 and a position engaging the stops 68 and thus opening flow from the passage 78 to the chamber 88.

As can best be seen in FIG. 3 the valve plates 84 are in the form of flat circular discs provided with chordally removed portions 89 so that they assume a substantially triangular shape in plan. This shape is preferred to aid in centering the plates and as a precaution against the valve plates 84 becoming wedged against the inner surface of the extended portions 86 at some intermediate position. Also the stops 68 are of a larger diameter than the valve plates 84 and are formed to provide radially extending tangs 90 so that the oil can pass through the spaces between the tangs 90 when the valve plate 84 is in a position against the stop 68.

As the invention has been thus far described and assuming that combustion chamber pressure is below the predetermined maximum value which the VCR piston 10 is designed to maintain and that the upper and lower chambers 30 and 32 are both filled with oil, during the latter part of each upward stroke of the piston 10 at the end of the exhaust stroke and the early part of each downward intake stroke the momentum of the outer member 14 tends to move it upwardly relative to inner member 12 thereby tending to expand upper chamber 30 and contract lower chamber 32. The resulting increase in oil pressure in lower chamber 32 as well as the inertial forces acting on the valve plates 84 will cause the lower valve plate 84 of the supply valve assembly 54 to move upwardly against the lower valve seat 82 to the position shown in FIG. 2 to close oil flow from the passage 52 to the lower chamber 32. This will produce a hydraulic lock between the members 12 and 14 by reason of the oil contained within the lower chamber 32 with the result that during each cycle of engine operation upward relative movement of the outer member 14 with respect to the inner member 12 will be slight and only to the degree permitted by the escape of oil from the lower chamber 32 by way of the orifice 37. Similarly the tendency of the upper chamber 30 to expand during this position in the piston operation and the effects of inertia on the valve plates 84 will cause the upper valve plate 84 of the supply valve assembly 54 to move to the upper position shown in FIG. 2 against the stop member 68 to open oil flow from the passage 52 to the upper chamber 30 to keep that chamber filled with oil.

The controlled discharge from the lower chamber 32 through the restricted orifice 37 then permits a gradual cyclic decrease in the volume of the lower chamber 32 and thus a corresponding increase in the volume of the upper chamber 30 to provide relative upward movement between the outer member 12 and the inner member 14. As the upper chamber 30 increases in volume, oil from the lubrication system is directed through the supply valve assembly 54 and to the upper chamber 30 to maintain that chamber in a filled condition.

During the compression and power stroke, the gas pressure acting on piston crown 16 is transmitted to the inner member 12 through the oil in the upper chamber 30 creating a high oil pressure in this chamber. Whenever the gas pressure exceeds the selected upper limit, sufficient oil pressure is built up in the upper chamber 30 to open the discharge valve assembly 58 and release some of the oil from chamber 30 allowing the outer member 14 to move downwardly relative to the inner member 12 and thus decreasing the compression ratio of the engine. The downward relative movement of the outer member 14 enlarges chamber 32 and the lower valve plate 84 of the supply valve assembly 14 is moved to the position shown in FIG. 1 against the lower stop member 68 to open the lower chamber 32 to passage 52 and then oil enters the lower chamber 32 to keep it fully charged. In this situation the pressure in upper chamber 30 as well as inertia cause the upper valve plate 84 to move to the position shown in FIG. 1 to close oil flow from the valve assembly 54 to the upper chamber 30.

The amount of oil discharged from the upper chamber 30 during any compression stroke depends upon the margin by which the cylinder gas pressure exceeds that necessary to cause the discharge valve assembly 58 to open and the duration of this excess pressure. The valve spring setting and the magnitude of duration of the excess gas pressure determines the downward movement of outer member 14 relative to inner member 12. The upward relative movement on the other hand is the same on each exhaust and induction stroke and is determined by the size of the fixed orifice 37. If the upward and downward relative movements are equal as is the case when the engine is running under a constant load the compression ratio will remain unchanged. If the load is increased, the downward movements will exceed the upward movements lowering the compression ratio until an equilibrium has been established. Conversely, if the load is reduced the compression ratio will increase to a new point of equilibrium.

The advantages of the supply valve assembly 54 of the present invention over similar means in the aforementioned patents resides in the unitary construction of the valve assembly and the combining of both of the one-way inlet check valve assemblies in a single casing. Heretofore the supply valves were comprised of a number of parts that were assembled individually in the inner member 12. The valves were difficult to preset and bench test and where later developments produced encapsulated valve assemblies, one assembly was required for each chamber. Although there have been some previous attempts to combine the supply valves within a single assembly these have generally been of a complicated construction requiring springs and the like. The present assemblies are of relatively few parts, operate under the influences of inertial forces as well as pressures produced during the operation of the engine without the aid of springs and thus are subject to less malfunction problems than previous similar valves.

Figure 5:
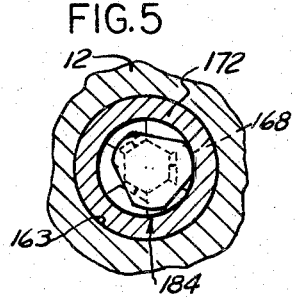
FIG. 5 is a cross-sectional view taken substantially on line 5—5 of FIG. 4.

FIGS. 4 and 5 illustrate another preferred supply valve assembly 154 of the present invention. The supply valve assembly 154 as can best be seen in FIG. 4 preferably comprises a port member 166 with stops 168 disposed at each end and mounted in position in a bore 163 by spacer cylinders 172 and retaining rings 174. Port member 166 is provided with an annular groove 176 which registers with the passage 52 and communicates with an interior through passage 178 by way of a series of annularly spaced ports 180. Valve seats 182 are formed in each end of the passage 178 and are adapted to be engaged by valve plates 184 similar to the valve plates described above.

The spacer members 172 are cylindrical and seat in annular recesses 186 formed on the exterior surface at each end of the port member 166 and space the ends of the port member 166 from the stop members 168 to form a chamber 188 therebetween.

As can best be seen in FIG. 5 the stop members 168 are formed by forming cuts in a circular member and extending portions 168A of the radial legs formed thereby upwardly and other portions 168B downwardly so that in the lower stop member the upwardly extending portions 168A form a stop for the valve plate 184 permitting fluid passage therebetween when the valve plate 184 is in position against the stop and similarly the downwardly extending radial portions 168B of the upper stop member 168 form a stop for the valve plate 184 when that plate is in the upward position.

Figure 7:
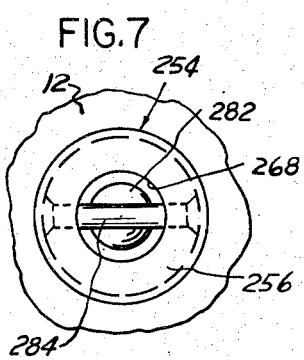
FIG. 7 is a top plan view of the structure shown in FIG. 6.

FIGS. 6 and 7 illustrate still another preferred supply valve assembly 254 as comprising a port member 256 mounted in a bore 262 formed in the inner member 12 by means of an upper threaded portion 264. The port member 256 is provided with an axial through bore 266 registering at opposite ends with an upper recess 268 and a lower recess 270. The passage 52 from the cavity 48 registers with a reduced diameter section 272 of the port member 256. O-ring seals 274 confine oil flow to an annular path about the exterior surface of the port member 256 and transverse bores 276 communicate the reduced diameter section 272 with the axial bore 266.

The junctures of the recesses 268 and 270 with the axial bore 266 form valve seats 278 and 280 respectively adapted to be opened and closed by ball type valve members 282. Cross pins 284 limit movement of the balls 282 as can best be seen in FIG. 7.

The valve assembly 254 operates substantially the same as those described above. The balls 282 move under the influence of pressure in the chambers 30 and 32 and inertial forces produced during operation of the engine to regulate oil flow to the chambers 30 and 32 in a manner to keep these chambers filled with oil and to permit escape of oil from the chambers only by way of the pressure regulating discharge valve assembly 58 and the restricted orifice 37.

In each of the assemblies described above a unitary assembly is provided for the conventional two separated assemblies ordinarily used to supply oil to the upper and lower chambers. In addition in each of these assemblies the valve members are freely mounted within the assemblies and move solely under the influence of oil pressure differentials and inertial forces so that no springs are necessary and therefore the assemblies are less costly, less complicated and less subject to malfunction than previous supply valve assemblies for variable compression ratio engines.

Having thus described our invention we claim:

1. In an internal combustion engine, a piston having first and second members movable relative to one another in response to reciprocation of the piston with respect to the combustion chamber of the engine, and having a first and a second chamber formed within said piston and varying oppositely in volume in response to movement of said first member relative to said second member and means for supplying fluid to said chambers comprising a supply valve assembly having one end communicating with said first chamber, an opposite end communicating with said second chamber and means registering said valve assembly intermediate the ends thereof with a pressure fluid source, a valve member carried at each end of said valve assembly, said valve members each being free to move solely under the influence of inertial forces and fluid pressures produced during operation of the engine intermediate a position in which fluid flow from the end of said valve assembly to the connected chamber is closed and a position in which such flow is open.

2. The combination as defined in claim 1 and in which each of said valve members comprises a substantially circular plate with chordal portions removed.

3. The combination as defined in claim 1 and in which each of said valve members comprises a ball.

4. The combination as defined in claim 1 and in which said valve assembly further comprises a valve seat formed at each end of said valve assembly as defined in claim 1, a stop member spaced from each valve seat intermediate the respective valve seat and a corresponding one of said chambers, said valve plate being freely movable intermediate a position engaging said valve seat and a position engaging said stop member.

5. In a variable compression ratio piston for an internal combustion engine having an inner member adapted for connection via a wrist pin to a connecting rod of the engine and an outer member carried on and movable axially relative to the inner member so that the crown of the outer member forms a variable boundary of the piston in the combustion chamber of the engine in which the piston reciprocates to thereby vary the clearance volume by movement of the crown relative to the wrist pin axis of the connecting rod, the combination therewith of a hydraulic system for said piston, said system comprising:

(a) a first chamber defined between said crown and an adjacent first surface of said inner member and a second chamber defined between a second surface of said inner member and an adjacent surface of said outer member, said first and second chambers varying oppositely in volume in response to said movement of said outer member relative to said inner member and means for regulating the flow of a hydraulic fluid to and from said chambers, (b) said last mentioned means including a supply valve assembly disposed within said inner member and means connecting said supply valve assembly with a source of hydraulic fluid, (c) said supply valve assembly comprising a port member registering with said source and normally directing fluid from said source through opposite ends of said port member and to said chambers, valve members carried at each end of said port member and movable to positions closing fluid flow through the associated ends of said port member, stop members spaced from the ends of said port member and said valve members being freely movable between the ends of said port member and said stop members.

6. The combination as defined in claim 5 and in which said valve members comprise flat plates and said stop members comprise circular members formed with radially extending removed portions.

7. The combination as defined in claim 5 and in which said valve members comprise balls and said stop members comprise pins extending transversely with respect to the path of fluid from said port members.

8. In a variable compression ratio piston for an internal combustion engine having a first member and a second member connected to said first member, said members being movable axially relative to one another whereby to vary the compression ratio of the combustion chamber of the engine in which the piston reciprocates, a fluid system for said piston, said system comprising:
   (a) a first chamber and a second chamber formed intermediate said members and varying in volume in response to relative movement of said members,
   (b) means for regulating the flow of a pressure fluid to and from said chambers,
   (c) said means including a supply valve assembly disposed in one of said members intermediate each of said chambers and a source of pressure fluid,
   (d) said supply valve assembly comprising means forming a valve seat for each of said chambers, a valve member associated with each of said seats and freely movable intermediate a first position closing fluid flow from said source to said associated chamber and a second position opening fluid from said source to said associated chamber,
   (e) said valve assembly being arranged parallel to the axis of reciprocation of said piston and in a manner to produce movement of said valve members by inertial forces produced during reciprocation of said piston in a direction which opens and closes fluid flow to said chambers in accordance with the converse variance in the volume of said chambers.

9. The combination as defined in claim 8 and in which each of said valve members comprises a flat substantially triangular valve plate.

10. The combination as defined in claim 9 and in which each of said valve members comprises a ball.

References Cited

UNITED STATES PATENTS

| | | | |
|---|---|---|---|
| 3,156,162 | 11/1964 | Wallace et al. | 123—48 |
| 3,161,112 | 12/1964 | Wallace et al. | 123—48 |
| 3,185,137 | 5/1965 | Dreyer | 123—48 |
| 3,185,138 | 5/1965 | Druzynski | 123—48 |
| 3,303,831 | 2/1967 | Sherman | 123—78 |
| 3,311,096 | 3/1967 | Bachle et al. | 123—78 |

WENDELL E. BURNS, *Primary Examiner.*